United States Patent
Harder et al.

(10) Patent No.: US 8,586,662 B2
(45) Date of Patent: Nov. 19, 2013

(54) FILLED POLYAMIDE MOLDING MATERIALS

(75) Inventors: Philipp Harder, Chur (CH); Jean-Jacques Linster, Chur (CH); Georg Stoppelmann, Bonaduz (CH)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 12/743,097

(22) PCT Filed: Nov. 12, 2008

(86) PCT No.: PCT/EP2008/009551
§ 371 (c)(1),
(2), (4) Date: Jul. 12, 2010

(87) PCT Pub. No.: WO2009/062692
PCT Pub. Date: May 22, 2009

(65) Prior Publication Data
US 2010/0279111 A1  Nov. 4, 2010

(30) Foreign Application Priority Data

Nov. 16, 2007 (EP) .................................. 07022306

(51) Int. Cl.
*C08L 77/00* (2006.01)
*C08L 101/00* (2006.01)

(52) U.S. Cl.
USPC ........... 524/494; 428/357; 524/423; 524/425; 524/430; 524/433; 524/444; 524/447; 524/449; 524/450; 524/451; 524/456; 524/492; 524/497; 524/500; 524/538; 525/432

(58) Field of Classification Search
USPC .......... 428/357; 524/423, 425, 430, 433, 447, 524/449, 450, 451, 456, 492, 497, 500, 538, 524/494, 444; 525/432
See application file for complete search history.

(56) References Cited

U.S. PATENT DOCUMENTS

| | | | |
|---|---|---|---|
| 2,516,585 A | 7/1950 | Pease | |
| 3,454,536 A | 7/1969 | Schade et al. | |
| 3,600,336 A | 8/1971 | Okada et al. | |
| 3,625,788 A | 12/1971 | Bartner | |
| 4,036,811 A | 7/1977 | Noetzel et al. | |
| 4,076,664 A | 2/1978 | Pagilagan | |
| 4,212,777 A | 7/1980 | Goletto | |
| 4,322,260 A | 3/1982 | Conlon | |
| 4,345,066 A | 8/1982 | Rüter | |
| 4,413,921 A | 11/1983 | Fotiu et al. | |
| 4,537,949 A | 8/1985 | Schmidt et al. | |
| 4,540,772 A | 9/1985 | Pipper et al. | |
| 4,603,166 A | 7/1986 | Poppe et al. | |
| 4,607,073 A | 8/1986 | Sakashita et al. | |
| 4,680,379 A | 7/1987 | Coquard et al. | |
| 4,731,421 A | 3/1988 | Hoppe et al. | |
| 4,826,951 A | 5/1989 | Coquard et al. | |
| 4,831,106 A | 5/1989 | Kempter et al. | |
| 4,831,108 A | 5/1989 | Richardson et al. | |
| 4,847,356 A | 7/1989 | Hoppe et al. | |
| 5,071,924 A | 12/1991 | Koch et al. | |
| 5,081,222 A | 1/1992 | Reimann et al. | |
| 5,098,940 A | 3/1992 | Brooks | |
| 5,177,177 A | 1/1993 | Thullen et al. | |
| 5,177,178 A | 1/1993 | Thullen et al. | |
| 5,191,060 A | 3/1993 | Akkapeddi et al. | |
| RE34,447 E | 11/1993 | Poppe et al. | |
| 5,278,231 A | 1/1994 | Chundury | |
| 5,302,691 A | 4/1994 | Soelch | |
| 5,310,860 A | 5/1994 | Maj et al. | |
| 5,342,862 A | 8/1994 | Reich | |
| 5,422,418 A | 6/1995 | Maj et al. | |
| 5,480,945 A | 1/1996 | Vicik | |
| 5,560,398 A | 10/1996 | Pfleger | |
| 5,612,446 A | 3/1997 | Presenz et al. | |
| 5,674,973 A | 10/1997 | Pipper et al. | |
| 5,684,120 A | 11/1997 | Torre | |
| 5,686,192 A | 11/1997 | Presenz et al. | |
| 5,688,901 A | 11/1997 | Fisch et al. | |
| 5,708,125 A | 1/1998 | Liedloff et al. | |
| 5,773,556 A | 6/1998 | Kleiner et al. | |
| 5,786,086 A | 7/1998 | Frihart et al. | |
| 5,807,972 A | 9/1998 | Liedloff et al. | |
| 5,917,004 A | 6/1999 | Liedloff et al. | |
| 5,957,607 A | 9/1999 | Tsai | |
| 6,008,288 A | 12/1999 | Dalla Torre | |

(Continued)

FOREIGN PATENT DOCUMENTS

| | | |
|---|---|---|
| CA | 861620 | 1/1971 |
| CA | 2019904 | 1/1991 |

(Continued)

OTHER PUBLICATIONS

"BIAZ, ein neuer Prüfkörper" (BIAX, a new inspection piece), published in Noss'Ovra staff magazine, Dec. 2006, No. 12, 29th year, EMS-CHEMIE AG (4 pgs.).

(Continued)

*Primary Examiner* — Ana Woodward
(74) *Attorney, Agent, or Firm* — Leydig, Voit & Mayer, Ltd.

(57) ABSTRACT

The invention relates to filled polyamide molding compounds which, in addition to a selected polymer mixture comprising two different polyamides, contain long glass fibers with a non-circular cross-sectional area. Furthermore, the invention relates to the use of such molding compounds for the production of molded articles and the molded articles themselves.

19 Claims, No Drawings

(56) References Cited

U.S. PATENT DOCUMENTS

| | | |
|---|---|---|
| 6,204,355 B1 | 3/2001 | Dalla Torre et al. |
| 6,255,371 B1 | 7/2001 | Schlosser et al. |
| 6,270,560 B1 | 8/2001 | Kleiner et al. |
| 6,291,633 B1 | 9/2001 | Nakamura |
| 6,303,741 B1 | 10/2001 | Tanaka |
| 6,319,986 B1 | 11/2001 | Amimoto et al. |
| 6,365,071 B1 | 4/2002 | Jenewein et al. |
| 6,547,992 B1 | 4/2003 | Schlosser et al. |
| 6,572,295 B1 | 6/2003 | Chochoy et al. |
| 6,706,790 B1 | 3/2004 | Berliet |
| 6,881,477 B2 | 4/2005 | Presenz et al. |
| 6,943,231 B2 | 9/2005 | Bühler |
| 7,014,315 B2 | 3/2006 | Iori et al. |
| 7,217,767 B2 | 5/2007 | Aguirre et al. |
| 7,249,844 B2 | 7/2007 | Sakai |
| 7,258,929 B2 | 8/2007 | Kanda et al. |
| 7,427,430 B2 | 9/2008 | Rhee et al. |
| 7,723,411 B2 | 5/2010 | Schneider |
| 7,807,245 B2 | 10/2010 | Bersted et al. |
| 7,807,742 B2 | 10/2010 | Tanaka et al. |
| 7,811,671 B2 | 10/2010 | Bushelman et al. |
| 7,981,518 B2 | 7/2011 | Sato |
| 8,022,170 B2 | 9/2011 | Hoffmann et al. |
| 8,268,956 B2 | 9/2012 | Bühler et al. |
| 2001/0007888 A1 | 7/2001 | Asano |
| 2003/0018107 A1 | 1/2003 | Heinen et al. |
| 2003/0023008 A1 | 1/2003 | Uchida et al. |
| 2003/0126788 A1 | 7/2003 | Uang et al. |
| 2003/0130381 A1 | 7/2003 | Joachimi et al. |
| 2003/0181585 A1 | 9/2003 | Handlin, Jr. et al. |
| 2003/0235666 A1 | 12/2003 | Bühler |
| 2004/158028 A1 | 8/2004 | Bühler |
| 2004/0230028 A1 | 11/2004 | Sato et al. |
| 2005/0049339 A1 | 3/2005 | Knop et al. |
| 2005/0101708 A1 | 5/2005 | Knop et al. |
| 2006/0138391 A1 | 6/2006 | Drewes et al. |
| 2006/0235190 A1 | 10/2006 | Hoffmann et al. |
| 2006/0264542 A1 | 11/2006 | Schneider |
| 2007/0072970 A1 | 3/2007 | Schneider |
| 2007/0104971 A1 | 5/2007 | Wursche et al. |
| 2007/0123632 A1* | 5/2007 | Rexin et al. ........... 524/494 |
| 2007/0172614 A1 | 7/2007 | Lee |
| 2007/0222941 A1 | 9/2007 | Sakai |
| 2007/0270544 A1 | 11/2007 | Bühler et al. |
| 2008/0135720 A1 | 6/2008 | Bühler et al. |
| 2008/0167415 A1* | 7/2008 | Stoeppelmann et al. ..... 524/494 |
| 2008/0207782 A1 | 8/2008 | Jacobs et al. |
| 2008/0274355 A1 | 11/2008 | Hewel |
| 2009/0127740 A1 | 5/2009 | Kirchner |
| 2009/0131569 A1 | 5/2009 | Schwitter et al. |
| 2009/0247699 A1 | 10/2009 | Buehler et al. |
| 2010/0022742 A1 | 1/2010 | Bühler et al. |
| 2010/0028646 A1 | 2/2010 | Schwitter et al. |
| 2010/0130677 A1 | 5/2010 | Amici et al. |
| 2010/0227122 A1* | 9/2010 | Kumazawa et al. ........... 428/156 |
| 2010/0297373 A1 | 11/2010 | Thullen et al. |
| 2010/0311882 A1 | 12/2010 | Eibeck et al. |
| 2011/0105655 A1 | 5/2011 | Harder et al. |
| 2011/0220667 A1 | 9/2011 | Pfleghar et al. |
| 2012/0029133 A1 | 2/2012 | Stoppelmann et al. |
| 2012/0237708 A1 | 9/2012 | Caviezel et al. |
| 2012/0321829 A1 | 12/2012 | Bayer et al. |

FOREIGN PATENT DOCUMENTS

| | | |
|---|---|---|
| CH | 280367 | 1/1952 |
| DE | 14 95 393 | 4/1969 |
| DE | 24 47 727 A1 | 4/1976 |
| DE | 26 42 244 A1 | 3/1977 |
| DE | 36 00 015 A1 | 7/1986 |
| DE | 90 01 242 U1 | 2/1991 |
| DE | 40 05 894 A1 | 12/1991 |
| DE | 43 29 676 A1 | 3/1994 |
| DE | 195 13 940 A1 | 1/1996 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59 048 A1 | 7/2004 |
| DE | 696 32 529 T2 | 9/2004 |
| DE | 103 16 873 A1 | 11/2004 |
| DE | 103 46 326 A1 | 5/2005 |
| DE | 694 28 832 T3 | 2/2007 |
| DE | 102010023770 A1 | 12/2011 |
| EP | 0 052 944 | 6/1982 |
| EP | 0 129 195 A2 | 12/1984 |
| EP | 0 129 196 A2 | 12/1984 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 325 923 A2 | 8/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 792 912 A2 | 9/1997 |
| EP | 0 796 886 A2 | 9/1997 |
| EP | 0 818 491 A2 | 1/1998 |
| EP | 0 725 100 B1 | 3/1998 |
| EP | 0 837 087 A1 | 4/1998 |
| EP | 0 976 774 A2 | 2/2000 |
| EP | 0 771 846 B1 | 1/2002 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 082 861 A1 | 7/2009 |
| EP | 1 474 459 B1 | 11/2009 |
| EP | 2 365 033 A1 | 9/2011 |
| GB | 766927 | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | 05-125184 A | 5/1993 |
| JP | 06-511281 T | 12/1994 |
| JP | 08-239469 A | 8/1996 |
| JP | 08-259808 | 10/1996 |
| JP | 09-078351 A | 3/1997 |
| JP | 10-168183 A | 6/1998 |
| JP | 10-219026 | 8/1998 |
| JP | 2001-261973 | 9/2001 |
| JP | 2004-083858 | 3/2004 |
| JP | 2006-045390 | 2/2006 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |

(56) References Cited

FOREIGN PATENT DOCUMENTS

| WO | WO 2004/090036 A1 | 10/2004 |
| WO | WO 2006/074934 A1 | 7/2006 |
| WO | WO 2006/122602 A1 | 11/2006 |
| WO | WO 2007/080754 A1 | 7/2007 |
| WO | WO 2007/087896 A1 | 8/2007 |
| WO | WO 2009/095440 A1 | 8/2009 |

OTHER PUBLICATIONS

English Translation of International Preliminary Report on Patentability for International Application PCT/EP2008/009551 dated Jun. 10, 2010.

Laura et al., "Effect of rubber particle size and rubber type on the mechanical properties of glass fiber reinforced, rubber-toughened nylon 6," *Polymer*, vol. 44, No. 11, pp. 3347-3361 (2003).

State Intellectual Property Office of the People's Republic of China, First Office Action in Chinese Patent Application No. 200880116197.8 (Aug. 8, 2011).

Cramer et al., "Some Isomorphous Copolyamides," *Journal of Polymer Science*, vol. 21, pp. 237-250 (1956).

Dolden, "Structure-property relationships in amorphous polyamides," *Polymer*, vol. 17, pp. 875-892 (1976).

Edgar et al., "The p-Phenylene Linkage in Linear High Polymers: Some Structure-Property Relationships," *Journal of Polymer Science*, vol. 8, No. 1, pp. 1-22 (1952).

Henkel Corporation, "Empol Dimer and Polybasic Acids: Technical Bulletin 114C," (1997).

Levine et al., "Isomorphous Replacement in a Copolyamide System," *Journal of Polymer Science*, Issue XLIX, pp. 241-246 (1961).

Unichema International, "Pripol C36-Dimer Acid,".

Yu et al., "Isomorphous Replacement in a Copolyamide System: Homologs of Adipic and Terephthalic Acids," *Am. Chem. Soc.*, Issue 81, pp. 5361-5365 (1959).

State Intellectual Property Office of the People's Republic of China, Examination Report in Chinese Patent Application No. 200880116197.8 (Apr. 12, 2012).

\* cited by examiner

FILLED POLYAMIDE MOLDING MATERIALS

The invention relates to filled polyamide moulding compounds which, in addition to a selected polymer mixture comprising two different polyamides, contain long glass fibres with a non-circular cross-sectional area. Furthermore, the invention relates to the use of such moulding compounds for the production of moulded articles and the moulded articles themselves.

Polyamides are widely used nowadays as structural elements for indoors and outdoors, which can be attributed essentially to the excellent mechanical properties.

An improvement in the mechanical properties, such as strength and rigidity, can be achieved in particular by the addition of fibrous reinforcing materials, e.g. long glass fibres.

Thus EP 0 246 620 B1 describes a long glass fibre-reinforced thermoplastic plastic material, long glass fibres with a rectangular, elliptical or envelope-shaped cross-section in cut form being used here.

In EP 0 376 616 B1, a thermoplastic polymer composition in which a fibre-like reinforcement is contained is disclosed, the latter having a non-circular cross-section and having a curved or semi-circular contour.

Finally DE 103 46 326 A1 discloses flameproof polyamide moulding compounds and the use thereof, long glass fibres with a round cross-section in the form of endless strands (rovings) or in cut form (long glass fibres) being incorporated here as reinforcing materials.

However it has been shown that the long glass fibre-reinforced plastic materials, known to date in the state of the art, even polyamide moulding compounds which contain long glass fibres, still do not deliver satisfactory results in all respects. It is therefore desirable to make available polyamide moulding compounds reinforced with long glass fibres and moulded articles which can be produced herefrom, which achieve low distortion, high transverse rigidity and strength and also excellent surface quality with at the same time a high filling degree with the reinforcing fibres. In particular, there is a great need to have moulded articles made of polyamide moulding compounds with long glass fibres which, with respect to notch impact strength and thermostability (HDT), have superior properties relative to the state of the art.

It is therefore the object of the present invention to indicate polyamide moulding compounds which can be processed to form moulded articles, the moulded articles being intended to have excellent properties as far as possible at the same time with respect to distortion, notch impact strength, transverse rigidity and strength and also surface quality and thermostability.

This object is achieved with respect to the moulding compound and the moulded article and the advantageous developments described herein.

The proposed filled polyamide moulding compound according to the invention is distinguished in that it has a polymer mixture which forms a polyamide matrix and has been formed from specific educts.

The polymer mixture comprises accordingly 55 to 85% by weight of at least one aliphatic polyamide A1 which is selected from the group PA6, PA46, PA66, PA610, PA612, PA6/12, PA1010, PA11, PA12, PA1012, PA1212 and/or mixture and/or copolyamides hereof.

Furthermore, the polymer mixture contains as second component 15 to 45% by weight of at least one polyamide (A2) which is selected from MACM10-18, PACM10-18, MACMI, MACMT, MXDI, MXD6, 6I, 6T and also mixtures and/or copolyamides hereof and also the copolyamides comprising (i) one or more copolyamide units selected from the group MACM10-18, PACM10-18, MACMI, MACMT, MXDI, MXD6, 6I, 6T, 6I/6T and (ii) one or more copolyamide units selected from the group comprising PA66, PA610, PA6 AND PA12. Preferred polyamides are MACM12, MACMI/12, MACM12/PACM12, MXD6, MXD6/MXDI, 6I, 6I/6T, 6T/66, 6T/6I/66, 6T/610, 6T/1010 and 6T/12. In particular the polyamides 6I/6T and MXD6/MXDI are used preferably as component (A2). Herein MACM10-18 represents the series MACM10, MACM11, MACM12, and so on up to MACM18. For example, MACM10 represents a polyamide made from 3,3'-dimethyl-4,4'-diaminocyclohexylmethane and 1,8-octanedicarboxylic acid monomers and MACM11 represents a polyamide made from 3,3'-dimethyl-4,4'-diaminocyclohexylmethane and 1,9-octanedicarboxylic acid monomers. PACM10-18 represents the series PACM10, PACM11, PACM12, and so on up to PACM18. For example, PACM10 represents a polyamide made from bis-4-(aminocyclohexyl)methane and 1,8-octanedicarboxylic acid monomers and PACM11 represents a polyamide made from bis-4-(aminocyclohexyl)methane and 1,9-octanedicarboxylic acid monomers. MACMI represents a polyamide made from 3,3'-dimethyl-4,4'-diaminocyclohexylmethane and isophthalic acid monomers, MACMT represents a polyamide made from 3,3'-dimethyl-4,4'-diaminocyclohexylmethane and terephthalic acid monomers, MXDI represents a polyamide made from m-xylylenediamine and isophthalic acid monomers, MXD6 represents a polyamide made from m-xylylenediamine and 1,4-butanedicarboxylic acid monomers.

As an alternative hereto (patent claim 2), the present invention includes the variant that the polymer mixture, with respect to the polyamides, can also comprise only the polyamide (A1).

It is now essential in the proposed filled polyamide moulding compound that, in the polyamide matrix which comprises 30 to 80% by weight of the above-described polymer mixture, 20 to 70% by weight of a long glass fibre with a non-circular cross-sectional area and a dimensional ratio of the main cross-sectional axis to the subsidiary cross-sectional axis of 2 to 8 is contained.

There are understood by the long glass fibres used according to the invention, long glass fibres with a flat shape and a non-circular cross-sectional area, these being used preferably in the form of endless strands (rovings). The dimensional ratio of the main cross-sectional axis to the subsidiary cross-sectional axis is thereby preferably between 3.5 and 6.0, particularly preferred between 3.5 and 5.0. The cross-sectional area is thereby preferably longitudinally oval, elliptical or almost rectangular. The long glass fibre itself can thereby be selected from the group comprising E-long glass fibres, A-long glass fibres, C-long glass fibres, D-long glass fibres, M-long glass fibres, S-long glass fibres and/or R-long glass fibres, E-long glass fibres being preferred. The long glass fibres per se can also be provided with an amino- or epoxysilane coating.

A further characterising feature of the long glass fibres used resides in the fact that the length of the main cross-sectional axis is preferably in the range of 6 to 40 μm, in particular of 17 to 30 μm and the length of the subsidiary cross-sectional axis is in the range of 3 to 20 μm, in particular of 4 to 10 μm.

The polyamide moulding compounds according to the invention can be produced by the known methods for the production of long fibre-reinforced rod granulate, in particular by pultrusion processes in which the endless fibre strand (roving) is completely saturated with the polymer melt and subsequently is cooled and cut.

The long fibre-reinforced rod-shaped granulate obtained in this way, which has preferably a granulate length of 3 to 25 mm, in particular of 4 to 12 mm, can be further processed with the normal processing methods (such as e.g. injection moulding, compaction) to form moulded parts, particularly good properties of the moulded part being achieved with gentle processing methods. In this context, gentle means above all that excessive fibre breakage and the great reduction in fibre length associated therewith is extensively avoided. In injection moulding, this means that screws with a large diameter should be used.

From a material point of view with respect to the composition of the polymer mixture (A) forming the polyamide matrix, the invention basically includes all combinations of the aliphatic polyamides mentioned under the features (A1) with the polyamide (A2). The aliphatic polyamides (A1) thereby preferably have a solution viscosity $\eta_{rel}$, measured in m-cresol (0.5% by weight, 20° C.) in the range of 1.3 to 2.3, preferably in the range of 1.35 to 1.9, in particular in the range of 1.40 to 1.85. The production of these aliphatic polyamides is effected, as known from the state of the art, by polymerisation or polycondensation of the corresponding lactams and/or aminocarboxylic acids and/or diamines and diacids.

In the case of the polyamides (A2), the copolyamides 6I/6T and also MXD6/MXDI are preferred. With respect to the copolyamides 6I/6T, two different composition ranges are particularly preferred. On the one hand, these are the amorphous copolyamides with a proportion of less than 50% by mol 6T units, a composition range 6T:6I of 20:80 to 45:55 being preferred and, on the other hand, these are the high-melting copolyamides with a 6T proportion of greater than 50% by mol, a composition range 6T:6I of 55:45 to 80:20, in particular of 70:30, being preferred. With respect to the copolyamides MXD6/MXDI, MXD6-rich compositions are preferred, in particular with an MXD6 content of greater than 80% by mol.

With respect to the polymer mixture (A) the following compositions are preferred:
(A1): PA 66
(A2): PA 6I/6T, the molar ratio being in the range of 65:35 to 75:25 or in particular being 67:33.
(A1): PA 610 and/or PA1010, the components in the case of a mixture being used in the ratio of 1:1 to 4:1.
(A2): PA 6I/6T, the molar ratio being in the range of 65:35 to 75:25 or in particular being 67:33.
(A1): Mixture of PA 6 and PA66, in the ratio of 1:2 to 1:4, in particular of 1:4
(A2): PA 6I/6T, the molar ratio being in the range of 65:35 to 75:25 or being in particular 67:33.
(A1): PA 66
(A2): PA 6I/6T, the molar ratio being in the range of 40:60 to 25:75 or in particular being 30:70.
(A1): PA 66
(A2): PA 6T/66, the molar ratio being in the range of 50:50 to 70:30 or in particular being 55:45.
(A1): PA 66
(A2): PA MXD6/MXDI, the molar ratio being in the range of 70:30 to 90:10 or in particular being 88:12.
(A1): PA12
(A2): PA MACM12.
(A1): PA12
(A2): PA MACMI/12, the content of laurinlactam being in the range of 15 to 45% by mol, preferably less than 40% by mol, in particular less than 35% by mol.

The component (A1) respectively being used preferably in the range of 60 to 80% by weight, in particular of 65 to 75% by weight and component (A2) preferably in the range of 20 to 40% by weight, in particular in the range of 25 to 35% by weight.

In a particular embodiment, the following compositions are preferred for the polymer mixture (polyamide matrix):
(A1): 70-100% by weight of PA 1010 or PA 1012 or PA 11 or PA 12
(A2): 0-30% by weight of PA MACM12 or PA MACMI/12 or PA PACM12/MACM12
it being preferred in particular if the polymer matrix is formed exclusively by component (A1).

In a further preferred embodiment, the component (A2) has a higher melting point than component (A1), the melting point of (A2) being greater than 270° C., in particular greater than 290° C.

In a further embodiment, the component is amorphous and has a glass transition temperature of greater than 90° C., preferably greater than 110° and particularly preferred greater than 140° C.

The polyamides (A2) thereby preferably have a solution viscosity $\eta_{rel}$, measured in m-cresol (0.5% by weight, 20° C.) in the range of 1.3 to 2.0, preferably in the range of 1.35 to 1.9, in particular in the range of 1.40 to 1.8.

The production of the polyamides (A2) is effected, as likewise known from the state of the art, by conversion of essentially molar quantities of the corresponding diamines and dicarboxylic acids and possibly lactams and/or aminocarboxylic acids.

The polymer mixture forming the polyamide matrix can furthermore, as already known from the state of the art, also contain particle- and/or layer-shaped fillers. These particle- and/or layer-shaped fillers (C) can be present in the polymer mixture in a proportion up to 30 per cent by weight. A preferred quantity of fillers is 0.1 to 20% by weight.

There may be mentioned as examples of fillers of this type which can be present in particle- and/or layer-shape, whiskers, talcum, mica, silicates, quartz, titanium dioxide, wollastonite, kaolin, silicic acids, magnesium carbonate, magnesium hydroxide, chalk, ground or precipitated calcium carbonate, lime, fieldspar, barium sulphate, permanent-magnetic or magnetisable metals or alloys, glass balls, hollow glass balls, hollow-ball silicate fillers, natural layer silicates, synthetic layer silicates and a mixture hereof.

There may be mentioned as preferred further reinforcing materials, for example carbon fibres (carbon fibres, graphite fibres), boron fibres, aramide- (p- or m-aramide fibres (e.g. Kevlar® or Nomex®, DuPont) or mixtures thereof) and basalt fibres, the mentioned reinforcing fibres being able to be used as long fibres, also in the form of a mixture of different fibres. In a further alternative embodiment according to the invention, the long glass fibres used according to the invention can be present in a mixture with carbon fibres (carbon fibres, graphite fibres). By exchanging a part of the long glass fibres for carbon fibres, a hybrid fibre-reinforced compound is hence produced, the rigidity of which is increased in comparison with purely long glass fibres. The mixture of glass- and carbon fibres can have a weight ratio of long glass fibre/carbon fibres of 70/30 to 97/3, in particular of 80/20 to 95/5.

Preferably, the moulding compounds according to the invention essentially contain only the component (B) as reinforcing fibre, in particular exclusively the component (B) as reinforcing fibre. The component (B), according to a further preferred embodiment, is present in the range of 30-60 per cent by weight, in particular 35-55 per cent by weight, preferably of at least 40 per cent by weight of the polyamide moulding compound, this proportion being formed preferably for the most part or even exclusively by long glass fibres with a non-circular cross-section.

In the polymer mixture which forms the polyamide matrix, also additives can furthermore be contained in a quantity up to 5% by weight, preferably in a quantity of 0.1 to 5% by weight. Normal additives are for example heat protection agents, antioxidants, light protection agents, lubricants, mould-release agents, nucleation agents, pigments, colourants and anti-drip agents and also mixtures hereof.

It has been shown in tests that in particular a polyamide moulding compound which contains the following components has superior properties:
A: 30-80% by weight of the polyamide matrix,
B: 20-70% by weight of long glass fibres,
C: 0.1%-20% by weight of filler, and
D: 0.1%-5% by weight of additives,
the sum of these components being 100% by weight.

It was found surprisingly that, if the filled polyamide moulding compounds are processed according to the invention to form moulded articles, moulded articles are obtained which have above-average properties, in particular with respect to notch impact strength, strength and rigidity and also thermostability. Obviously, the long glass fibres used according to the invention form, by matting the fibre fragments formed during production of the moulding compounds and of the moulded articles, a spun yarn (fibre agglomerate) in the moulded article, which effectively prevents the propagation of tears and contributes to the dimensional stability at higher temperatures and thus makes possible excellent properties. The pronounced matting of the flat long glass fibres in the moulded article is reinforced even more in that the flat long glass fibres are damaged less greatly during compounding and injection moulding than the normal long glass fibres with a circular cross-section. The deeply viscous polyamide matrix contributes hereto also very decisively and ensures even under unfavourable circumstances, such as e.g. high shearing during the injection moulding of the manufacture, that the fibre fragments in the moulded article have a sufficient average length and length distribution, which lead to a pronounced three-dimensional fibre agglomeration and hence to excellent properties.

It should be stressed in particular in the case of the moulding compound according to the invention and the moulded articles produced therefrom that the notch impact strength at 23° C. is higher by at least 15% than that of the comparable polyamide moulding compound with long glass fibres with a circular cross-section as strengthening. It has even been shown that the notch impact strength with comparable polyamide moulding compounds is higher by 20-50%.

Furthermore, it should be stressed that the moulding compounds according to the invention and the moulded articles produced therefrom have a thermostability under load according to ASTM D 648 (HDT-C) which is greater by at least 5° than that of the comparable polyamide moulding compounds with long glass fibre with a round cross-section as strengthening. It has even been shown that the HDT C with the comparable polyamide moulding compounds is greater by up to 10° C.

Surprisingly, in the case of the moulding compounds according to the invention and the moulded articles produced therefrom, it could be established that the transverse rigidity and transverse strength, relative to comparable polyamide moulding compounds with long glass fibres with a circular cross-section, could be significantly improved. In the case of the moulding compounds according to the invention and the moulded articles produced therefrom, the transverse rigidity (measured transversely relative to the spraying direction) is at least 55%, preferably at least 58% of the measured longitudinal rigidity. In the case of comparable polyamide moulding compounds with long glass fibres with a circular cross-section, the transverse rigidity is at best 50% with respect to the longitudinal rigidity.

Furthermore, the moulding compounds according to the invention are distinguished by very good processibility and flowability. The suitably selected matrix components (A1) and (A2), on the one hand, and also the special geometry of the long planar long glass fibres contribute hereto equally.

The invention is explained subsequently in more detail with reference to the following examples.

The subsequently mentioned materials were used in the examples and comparative examples:
PA Type A: polyamide-66 with $n_{rel}$=1.82, RADICI, Italy
PA Type B: polyamide 6I/6T (67:33) with $n_{rel}$=1.57, EMS-CHEMIE AG, Switzerland
PA Type C: polyamide 6I/6T (30:70) with $n_{rel}$=1.52, EMS-CHEMIE AG, Switzerland
PA Type D: polyamide MXD6/MXDI (88:12) with $n_{rel}$=1.62, EMS-CHEMIE AG, Switzerland
PA Type E: polyamide 12 with $n_{rel}$=1.65, EMS-CHEMIE AG, Switzerland
PA Type F: polyamide 12 with $n_{rel}$=1.86, EMS-CHEMIE AG, Switzerland
PA Type G: polyamide MACM12 with $n_{rel}$=1.74, EMS-CHEMIE AG, Switzerland
PA Type H: polyamide MACMI/12 with $n_{rel}$=1.70, EMS-CHEMIE AG, Switzerland
Long glass fibres Type A: flat long glass fibre rovings, 27 μm wide, 7 μm thick, aspect ratio of the cross-sectional axes=3.8, aminosilane size (long flat long glass fibres, according to the invention)
Long glass fibres Type B: NITTOBO CSG3PA-820, 3 mm long, 28 μm wide, 7 μm thick, aspect ratio of the cross-sectional axes=4, aminosilane size, NITTO BOSEKI, Japan (flat cut long glass fibres, state of the art)
Long glass fibres Type C: in cross-section, circular long glass fibre rovings, OC4531, 17 μm diameter, Owens Corning (long glass fibres with circular cross-section, state of the art)

The moulding compounds of the compositions in Table 1 and 2 are produced on a twin-screw extruder by the company Werner and Pfleiderer Type ZSK 30. The granulates of the components (A1) and (A2) and also the additives are metered into the feed zone. The long glass fibre is metered into the polymer melt via a side feeder 3 in housing units in front of the nozzle.

The housing temperature was adjusted as an increasing profile to 290° C. At 150 to 200 rpm, 10 kg throughput was achieved. The granulation was effected by means of underwater granulation or hot cutting under water in which the polymer melt is pressed through a perforated nozzle and is granulated immediately after leaving the nozzle by a rotating blade in a water flow. After granulation and drying at 110° C. for 24 h, the granulate properties were measured and the test bodies produced.

The test bodies were produced on an Arburg injection moulding unit, the cylinder temperatures of 260° to 300° and a screw circumferential speed of 15 m/min being set. The moulding temperature was chosen at 100-140° C.

The measurements were implemented according to the following standards and on the following test bodies.
Tensile Modulus of Elasticity:
ISO 527 with a tensile speed of 1 mm/min
ISO tensile bar, standard: ISO/CD 3167, Type A1, 170×20/10×4 mm, temperature 23° C.

The transverse rigidity was determined on a BIAX test body (BIAX published in Noss'Ovra staff magazine, December 2006, No. 12, 29$^{th}$ year, EMS-CHEMIE AG) which allows direction-dependent measurement of the rigidity and strength.

Tearing strength and breaking elongation:
ISO 527 at a tensile speed of 5 mm/min
ISO tensile bar, standard: ISO/CD 3167, Type A1, 170×20/10×4 mm, temperature 23° C.
The transverse strength was determined on a BIAX test body (BIAX published in Noss'Ovra staff magazine, December 2006, No. 12, 29$^{th}$ year, EMS-CHEMIE AG) which allows direction-dependent measurement of the rigidity and strength.

Impact strength according to Charpy:
ISO 179/*eU
ISO test bar, standard: ISO/CD 3167, Type B1, 80×10×4 mm, temperature 23° C.
*1=not instrumented, 2=instrumented Notch impact strength according to Charpy:
ISO 179/*eA
ISO test bar, standard: ISO/CD 3167, Type B1, 80×10×4 mm, temperature 23° C.
*1=not instrumented, 2=instrumented Glass transition temperature (Tg), melt enthalpy (ΔH)
ISO standard 11357-1/-2
Granulate The differential scanning calorimetry (DSC) was implemented with a heating rate of 20° C./min.

Relative Viscosity:
DIN EN ISO 307, in 0.5% by weight of m-cresol solution, temperature 20° C.

MVR: (Melt Volume Rate)
according to ISO 1133 at 330 or 340° C. and a load of 21.6 kg Flow Length:
The flow lengths were determined by means of an Arburg injection moulding machine (Type: ARBURG-ALL-ROUNDER 320-210-750). Flow spirals of the dimension 1.5 mm×10 mm were prepared at a compound temperature of 290° and a mould temperature of 100° C.

Unless otherwise noted in the Table, the test bodies are used in the dry state. For this purpose, the test bodies are stored after the injection moulding for at least 48 h at room temperature in a dry environment.

TABLE 1

Composition and properties of examples 1-3 and comparative examples VB1 and VB2

| Example | Unit | 1 | 2 | 3 | VB1 | VB2 |
|---|---|---|---|---|---|---|
| Composition | | | | | | |
| PA Type A | % by wt. | 37.5 | 37.5 | 37.5 | 37.5 | 37.5 |
| PA Type B | % by wt. | 12.5 | | | 12.5 | 12.5 |
| PA Type C | % by wt. | | 12.5 | | | |
| PA Type D | % by wt. | | | 12.5 | | |
| Long glass fibres Type A | % by wt. | 50.0 | 50.0 | 50.0 | | |
| Long glass fibres Type B | % by wt. | | | | 50.0 | |
| Long glass fibres Type C | % by wt. | | | 0 | | 50.0 |
| Properties | | | | | | |
| HDT A | ° C. | 256 | 257 | 255 | 245 | 255 |
| HDT C | ° C. | 230 | 232 | 230 | 175 | 220 |
| Tensile modulus of elasticity long. | MPa | 16000 | 16100 | 16050 | 15870 | 15900 |
| Tensile modulus of elasticity trans. | MPa | 9600 | 9650 | 9600 | 7900 | 7950 |
| Tearing strength long. | MPa | 220 | 222 | 212 | 204 | 210 |
| Tearing strength trans. | MPa | 148 | 151 | 147 | 134 | 133 |
| Impact strength Charpy, 23° C. | kJ/m$^2$ | 90 | 90 | 85 | 75 | 80 |
| Notch impact strength Charpy, 23° C. | kJ/m$^2$ | 45 | 42 | 41 | 25 | 31 |
| Flow length (290°/100° C.) | mm | 300 | 280 | 320 | 250 | 230 |

The moulding compounds according to examples 1-3, with respect to the thermostability HDT-C, notch impact strength, rigidity and strength, display advantages, in particular transversely relative to the spraying direction, relative to the comparative examples VB1 and 2. At the same time, the moulding compounds according to the invention have good flow properties so that even thin-wall moulded articles can be produced without difficulty. The processing of moulding compounds according to the state of the art must frequently be regarded as critical so that, despite gentle processing or special tool geometry, greater damage to the fibre must be accepted in comparison with the polyamide moulding compounds according to the invention.

TABLE 2

Composition and properties of examples 4-7 and comparative examples VB3

| Example | Unit | 4 | 5 | 6 | 7 | VB3 |
|---|---|---|---|---|---|---|
| Composition | | | | | | |
| PA Type E | % by wt. | 50.0 | | 40.0 | 40.0 | 50.0 |

TABLE 2-continued

Composition and properties of examples 4-7 and comparative examples VB3

| Example | Unit | 4 | 5 | 6 | 7 | VB3 |
|---|---|---|---|---|---|---|
| PA Type F | % by wt. |  | 50.0 |  |  |  |
| PA Type G | % by wt. |  |  | 10.0 |  |  |
| PA Type H | % by wt. |  |  |  | 10.0 |  |
| Long glass fibres Type A | % by wt. | 50.0 | 50.0 | 50.0 | 50.0 |  |
| Long glass fibres Type C | % by wt. |  |  |  |  | 50.0 |
| Properties |  |  |  |  |  |  |
| HDT A | °C. | 176 | 177 | 176 | 176 | 1766 |
| HDT C | °C. | 160 | 163 | 160 | 159 | 154 |
| Tensile modulus of elasticity long. | MPa | 14300 | 14340 | 14360 | 14350 | 14060 |
| Tensile modulus of elasticity trans. | MPa | 8250 | 8200 | 8470 | 8320 | 6850 |
| Tearing strength long. | MPa | 195 | 198 | 196 | 196 | 190 |
| Tearing strength trans. | MPa | 101 | 103 | 105 | 102 | 94 |
| Impact strength Charpy, 23° C. | kJ/m$^2$ | 98 | 100 | 100 | 95 | 90 |
| Notch impact strength Charpy, 23° C. | kJ/m$^2$ | 52 | 55 | 53 | 52 | 41 |
| Flow length (280°/80° C.) | mm | 245 | 210 | 230 | 240 | 170 |

A comparison of examples 4-7 with the comparative example VB3 shows that the moulding compounds according to the invention, with respect to HDT-C, rigidity and strength, in particular transversely relative to the spraying direction, and also notch impact strength, are superior to the materials of the state of the art. Furthermore, the moulding compounds according to the invention can be processed significantly better and have better flow behaviour.

The invention claimed is:

1. A filled polyamide (PA) moulding compound made of
A) 30-80% by weight of a polyamide matrix containing polyamides A1 and A2:
   A1) 55 to 85% by weight, of the total weight of A1 and A2, an aliphatic polyamide selected from the group consisting of PA6, PA46, PA66, PA610, PA612, PA6/12, PA1010, PA11, PA12, PA1012, PA1212, mixtures thereof and copolyamides thereof, and
   A2) (a) 15 to 45% by weight, of the total weight of A1 and A2, a polyamide selected from the group consisting of MACM10-18, PACM10-18, MCMI, MCMT, MXDI, MXD6, 6I, 6T, and mixtures thereof,
   (b) 15 to 45% by weight, of the total weight of A1 and A2, at least one copolyamide comprising (i) one or more polyamide units selected from the group consisting of MACM10-18, PACM10-18, MACMI, MACMT, MXDI, MXD6, 6I, and 6T, and (ii) one or more polyamide units selected from the group consisting of PA66, PA610, PA6 and PA12, or
   (c) 15 to 45% by weight, of the total weight of A1 and A2, a copolyamide selected from the group consisting of MXD6/MXDI, MACM12, PACM12/MACM12, 6T/66, and 6I/6T, and
B) 20 to 70% by weight of a glass fibre with non-circular cross-sectional area and a dimensional ratio of the main cross-sectional axis to the subsidiary cross-sectional axis of 2 to 8;
wherein the polyamide matrix
C) optionally contains up to 30% by weight of the polyamide matrix a particle- and/or layer-shaped filler C selected from the group consisting of whiskers, talcum, mica, silicates, quartz, titanium dioxide, wollastonite, kaolin, silicic acids, magnesium carbonate, magnesium hydroxide, chalk, ground or precipitated calcium carbonate, lime, feldspar, barium sulphate, permanent-magnetic or magnetizable metals or alloys, glass balls, hollow glass balls, hollow-ball silicate fillers, natural layer silicates, synthetic layer silicates and mixtures thereof; and
D) optionally up to 5% by weight of the polyamide matrix an additive D selected from the group consisting of heat protection agents, antioxidants, light protection agents, lubricants, mould-release agents, nucleation agents, pigments, colourants and anti-drip agents and mixtures thereof,
with the proviso that the sum of A+B+C+D is 100% by weight,
wherein the filled PA moulding compound is free of carbon fibres.

2. The filled PA moulding compound according to claim 1, wherein the dimensional ratio of the main cross-sectional axis to the subsidiary cross-sectional axis is between 3.5 and 6.0.

3. The filled PA moulding compound according to claim 1, wherein the glass fibre is selected from the group consisting of E-glass fibres, A-glass fibres, C-glass fibres, D-glass fibres, M-glass fibres, S-glass fibres, and R-glass fibres, and any combination thereof.

4. The filled PA moulding compound according to claim 1, wherein, in the case of the glass fibres, the length of the main cross-sectional axis is 6 to 40 μm and the length of the subsidiary cross-sectional axis is 3 to 20 μm.

5. The filled PA moulding compound according to claim 1, wherein the heat deflection temperature under load according to ASTM D 648 (HDT-C) is greater by at least 5° C. than the HDT-C of a comparable filled moulding compound with respect to the PA matrix which is filled with long glass fibre with a round section in comparable quantity ratios.

6. The filled PA moulding compound according to claim 5, wherein the HDT-C is greater by 10° C.

7. The filled PA moulding compound according to claim 1, wherein the transverse rigidity, measured transversely relative to the spraying direction, is greater by at least 55% than the longitudinal rigidity.

8. The filled PA moulding compound according to claim 1, which contains from 0.1 to 30% by weight of particle- and/or layer-shaped filler C.

9. The filled PA moulding compound according to claim 1, which contains from 0.1 to 5% by weight of additive D.

10. The filled PA moulding compound according to claim 1, which contains the following components:
A: 30-80% by weight of the polyamide matrix,
B: 20-70% by weight of glass fibre,
C: 0.1-20% by weight of filler and
D: 0.1-5% by weight of additive,
with the proviso that the sum of A+B+C+D is 100% by weight.

11. A fibre-reinforced rod granulate comprising a fibre strand and the filled PA moulding compound according to claim 1.

12. A moulded article produced from a filled polyamide moulding compound according to claim 1.

13. The moulded article according to claim 12, wherein the article has been produced by means of injection moulding, extrusion, pultrusion, or blow moulding.

14. The filled polyamide (PA) moulding compound of claim 1, wherein A2 is:
(a) 15 to 45% by weight, of the total weight of A1 and A2, a polyamide selected from the group consisting of MACM10-18, PACM10-18, MCMI, MCMT, MXDI, 6I, 6T, and mixtures thereof,
(b) 15 to 45% by weight, of the total weight of A1 and A2, at least one copolyamide comprising (i) one or more polyamide units selected from the group consisting of MACM10-18, PACM10-18, MACMI, MACMT, MXDI, 6I, and 6T, and (ii) one or more polyamide units selected from the group consisting of PA66, PA610, PA6 and PA12, or
(c) 15 to 45% by weight, of the total weight of A1 and A2, a copolyamide 6I/6T.

15. The filled polyamide (PA) moulding compound of claim 14, wherein A1 is PA66 or PA12.

16. The filled polyamide (PA) moulding compound of claim 15, wherein A2 is 6I/6T, MACM12, or MACMI/12.

17. The filled polyamide (PA) moulding compound of claim 16, which has a notched impact strength, Charpy, at 23° C. of 41 to 55 kJ/m$^2$.

18. The filled polyamide (PA) moulding compound of claim 14, which has a notched impact strength, Charpy, at 23° C. of 41 to 55 kJ/m$^2$.

19. The filled polyamide (PA) moulding compound of claim 15, which has a notched impact strength, Charpy, at 23° C. of 41 to 55 kJ/m$^2$.

* * * * *